United States Patent
Gu et al.

(10) Patent No.: US 12,556,533 B1
(45) Date of Patent: Feb. 17, 2026

(54) PROTECTING PRIVATE INFORMATION DURING LARGE LANGUAGE MODULE INTERACTIONS

(71) Applicant: Gen Digital Inc., Tempe, AZ (US)

(72) Inventors: Lei Gu, Bedford, MA (US); Iskander Sanchez Rola, Antibes (FR)

(73) Assignee: GEN DIGITAL INC., Tempe, AZ (US)

( * ) Notice: Subject to any disclaimer, the term of this patent is extended or adjusted under 35 U.S.C. 154(b) by 149 days.

(21) Appl. No.: 18/616,768

(22) Filed: Mar. 26, 2024

(51) Int. Cl.
*H04L 29/06* (2006.01)
*G06F 21/62* (2013.01)
*H04L 9/40* (2022.01)

(52) U.S. Cl.
CPC ........ *H04L 63/083* (2013.01); *G06F 21/6245* (2013.01)

(58) Field of Classification Search
None
See application file for complete search history.

(56) References Cited

U.S. PATENT DOCUMENTS

| | | | | |
|---|---|---|---|---|
| 12,236,193 B1* | 2/2025 | Kuperman | ............ | G06F 40/284 |
| 2015/0150144 A1* | 5/2015 | Hughes | ............... | G06F 21/6254 |
| | | | | 726/26 |
| 2018/0288029 A1* | 10/2018 | Nath | .................... | G06F 21/6245 |
| 2020/0265365 A1* | 8/2020 | Kim | ........................ | G06Q 10/10 |
| 2021/0243233 A1* | 8/2021 | Singh | .................. | H04L 63/0435 |
| 2021/0297401 A1* | 9/2021 | Nath | ...................... | H04L 63/083 |
| 2024/0338479 A1* | 10/2024 | Larmuseau | ......... | G06F 21/6245 |
| 2024/0427994 A1* | 12/2024 | Odland | ..................... | G06N 3/08 |
| 2025/0165899 A1* | 5/2025 | Kim | ..................... | G06Q 10/105 |

OTHER PUBLICATIONS

DeGeurin, Mack; gizmodo.com; Oops: Samsung Employees Leaked Confidential Data to ChatGPT; website located at: https://gizmodo.com/chatgpt-ai-samsung-employees-leak-data-1850307376; Apr. 6, 2023.

\* cited by examiner

*Primary Examiner* — Shin-Hon (Eric) Chen
(74) *Attorney, Agent, or Firm* — MASCHOFF BRENNAN (57) ABSTRACT

Systems and methods for protecting private information during large language module (LLM) interactions. In one embodiment, an LLM gateway may route user prompts through a client server that possesses its own access credentials to an LLM server. The access credentials of the client server may be separate from and unassociated with the user. The client server may access the LLM using its own access credentials, submit the user's prompt to the LLM server, and return the results to the user. Routing user prompts through a client server that possesses its own LLM access credentials may help to ensure that user prompts cannot be traced back to the user or to personal information that a user disclosed in order to gain access to an LLM server.

9 Claims, 6 Drawing Sheets

PROTECTING PRIVATE INFORMATION DURING LARGE LANGUAGE MODULE INTERACTIONS

BACKGROUND

Large language models (LLMs) are sophisticated artificial intelligence systems designed to understand and generate human-like text. Utilizing deep learning techniques, LLMs learn patterns and structures from vast amounts of text data, enabling them to comprehend context, generate coherent responses, and perform various language-related tasks such as translation, summarization, and question answering. LLMs are typically trained on massive datasets that may consist of millions or even billions of parameters.

With the rapid advance of innovation in the LLM space, user privacy has unfortunately taken a backseat. Disclosure of private information can be especially problematic with LLMs, as the inner working of LLMs are often not well understood and therefore uncertain and unpredictable. Breaches of user privacy and confidentiality through LLM interactions are already common and can happen in many different ways.

For example, LLM providers often require users to create accounts and obtain keys or credentials to access the servers on which their LLMs are available. Disclosure of personal information, such as a user's name, age, address, birthdate, etc. may be required to create these accounts. Disclosure of this information, however, may enable the LLM and others to trace a user's prompts, or LLM inquiries, back to the user that submitted the prompt. This creates the potential of publicly revealing private information that has been submitted to the LLM.

In addition, LLMs often retain user prompts, including any uploaded documentation, for model training purposes. While this practice may not be problematic for prompts that do not include any private information, if confidential or otherwise private information is uploaded to an LLM, it may become publicly accessible. This practice has already caused significant damage to individuals and entities who have had their personal or confidential information made public through prompts uploaded to LLM servers.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for protecting private information during large language module (LLM) interactions may be performed, at least in part, by a computing device including one or more processors. The method may include receiving a prompt from a user and routing the prompt through a client server that possesses access credentials to an LLM server. In some embodiments, the access credentials of the client server may be unassociated with the user. The method may also include accessing, by the client server, the LLM server through the access credentials, submitting, by the client server, the prompt to the LLM server, and returning results from the LLM server to the user.

In some embodiments, the access credentials may include a username and password.

In some embodiments, obtaining access credentials may require disclosure of personal information. In these embodiments, the personal information may include a name and a birth date.

In some embodiments, geographical locations of the user and the client server may be different.

In some embodiments, the method may further include receiving a second prompt from the user, routing the second prompt through a second client server that possesses second access credentials to the LLM server, wherein geographical locations of the client server and the second client server are different, accessing, by the second client server, the LLM server through the second access credentials, submitting, by the second client server, the second prompt to the LLM server, and returning results from the LLM server to the user.

In some embodiments, the method may further include receiving a ranked listing of LLM providers based on levels of user privacy offered, analyzing the prompt to determine a level of sensitivity associated with the prompt, wherein the level of sensitivity is determined based on an amount and/or degree of private information contained within the prompt, and selecting the LLM server based on the level of sensitivity associated with the prompt and a level of user privacy offered by the LLM provider associated with the LLM server.

In these embodiments, the private information may include personal information about the user or information that is not publicly known. In these embodiments, the prompt may be determined to have a low level of sensitivity and the LLM server may be an open source LLM provider. In these embodiments, the prompt may be determined to have a high level of sensitivity and the LLM server may be a private LLM provider.

In another embodiment, a computer-implemented method for protecting private information during large language module (LLM) interactions may include receiving a ranked listing of LLM providers based on levels of user privacy offered and receiving a prompt from a user. The method may also include analyzing the prompt to determine a level of sensitivity associated with the prompt, wherein the level of sensitivity associated with the prompt may be determined based on an amount and/or degree of private information contained within the prompt. The method may also include identifying, based on the level of sensitivity associated with the prompt and the levels of user privacy offered, an LLM provider to respond to the prompt, sending the prompt to an LLM server associated with the identified LLM provider, and returning results from the LLM server to the user.

In some embodiments, the private information may include personal information about the user or information that is not publicly known.

In some embodiments, ranking the plurality of LLM providers may include consideration of whether each LLM provider in the plurality of LLM providers uses the prompt to further train their models.

In some embodiments, ranking the plurality of LLM providers may include consideration of whether each LLM provider in the plurality of LLM providers maintains user prompts confidential.

In some embodiments, the method may further include receiving a follow up prompt from the user, wherein the follow up prompt is in the same conversation as the prompt and analyzing the follow up prompt to determine a level of sensitivity associated with the follow up prompt. The level of sensitivity associated with the follow up prompt may be determined based on an amount and/or degree of private information contained within the follow up prompt, and identifying the LLM provider to respond to the follow up prompt may be based on the level of sensitivity associated with the prompt, the level of sensitivity of the follow up prompt, and the determined levels of user privacy offered by the plurality of LLM providers.

In these embodiments, the LLM provider may be identified based on the highest level of sensitivity between the prompt and the follow up prompt.

In yet another embodiment, a computer-implemented method for protecting private information during large language module (LLM) interactions may include receiving a ranked listing of LLM providers based on levels of user privacy offered, receiving an original prompt from a user, analyzing the original prompt to identify at least one element of private information contained within the original prompt, determining that the at least one element of private information can be removed from the original prompt, creating a revised prompt that redacts the at least one element of private information from the original prompt, analyzing the revised prompt to determine a level of sensitivity associated with the revised prompt, wherein the level of sensitivity associated with the prompt is determined based on an amount and/or degree of private information that remains within the revised prompt, identifying, based on the level of sensitivity associated with the revised prompt and the levels of user privacy offered, an LLM provider to respond to the revised prompt, sending the revised prompt to an LLM server associated with the identified LLM provider, and returning results from the LLM server to the user.

In some embodiments, determining that the at least one element of private information can be removed from the original prompt may be based on an analysis of whether removal of the at least one element of private information will impact a response to the original prompt.

In some embodiments, the private information may include personal information about the user or information that is not publicly known.

In some embodiments, ranking the plurality of LLM providers may include consideration of whether each LLM provider in the plurality of LLM providers uses the prompt to further train their models.

In some embodiments, one or more non-transitory computer-readable media may comprise one or more computer-readable instructions that, when executed by one or more processors of a computing device, cause the computing device to perform a method for protecting private information during large language module (LLM) interactions.

In some embodiments, a computing device comprising one or more processors and one or more non-transitory computer-readable media comprising one or more computer-readable instructions that, when executed by the one or more processors, may cause the computing device to perform a method for protecting private information during large language module (LLM) interactions.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings, in which.

DETAILED DESCRIPTION

Users may unknowingly and unintentionally share private information, including personal and other confidential information, through their interactions with large language models (LLMs) such as ChatGPT®, Gemini®, Bedrock®, etc. LLM providers often require users to obtain access keys or credentials (such as a username and password) in order to interact with a server that hosts an LLM. Obtaining an access key or credential may require the disclosure of some personal information, such as the user's name, age, address, birthdate, etc. Disclosure of this information may enable the LLM or others to trace back to a user the prompts that the user submits to the LLM, once access is acquired. As used herein, the term "prompt" includes any piece of data or information that a user may upload to an LLM and includes requests, statements, queries, questions, files, documents, images, etc.

To avoid disclosure of this information, some embodiments disclosed herein may employ an LLM gateway that routes user prompts through a client server that possesses its own access credentials to an LLM server. The access credentials of the client server are separate from and unassociated with the user. The client server may access the LLM using its own access credentials, submit the user's prompt to the LLM server, and return the results to the user. Routing user prompts through a client server that possesses its own LLM access credentials may help to ensure that user prompts cannot be traced back to the user or to personal information that a user disclosed in order to gain access to an LLM server.

In some embodiments, a location of the user that submitted the prompt may also be protected from discovery by an LLM server. For example, embodiments disclosed herein may employ a plurality of client servers that are geographically distributed around the world. User prompts may be randomly assigned to a client server thus ensuring that knowledge of a location of a server used to submit a user prompt does not reveal a location of the user.

In addition to correlating prompts with users and their locations, users may also unknowingly and unintentionally share private information through prompts themselves. This may occur, for example, when a user discloses information that is private or otherwise confidential within the prompt. For example, if a user uploads a personal financial document with a request to summarize the financial document, the document itself may become publicly accessible. To protect against this type of disclosure, some embodiments disclose herein may receive a prompt from a user and analyze the prompt to determine a level of sensitivity associated with the prompt. In some embodiments, the level of sensitivity associated with the prompt may be determined based on an amount of private information that is contained within the prompt. A plurality of LLM providers may be ranked based on levels of user privacy that they offer. Then, based on the level of sensitivity associated with the prompt and the determined levels of user privacy offered, an LLM provider to respond to the prompt may be identified and the prompt may be sent to an LLM server that is associated with the identified LLM provider.

In some embodiments, a prompt that includes private or confidential information may be further analyzed to determine whether the sensitive information is necessary to receive a complete response to the prompt. In cases where the sensitive information is not necessary, it may be redacted from the prompt or replaced with nonsensitive information and a revised prompt may be sent to an LLM server that offers a level of user privacy that is appropriate for the revised prompt.

Figure 1:
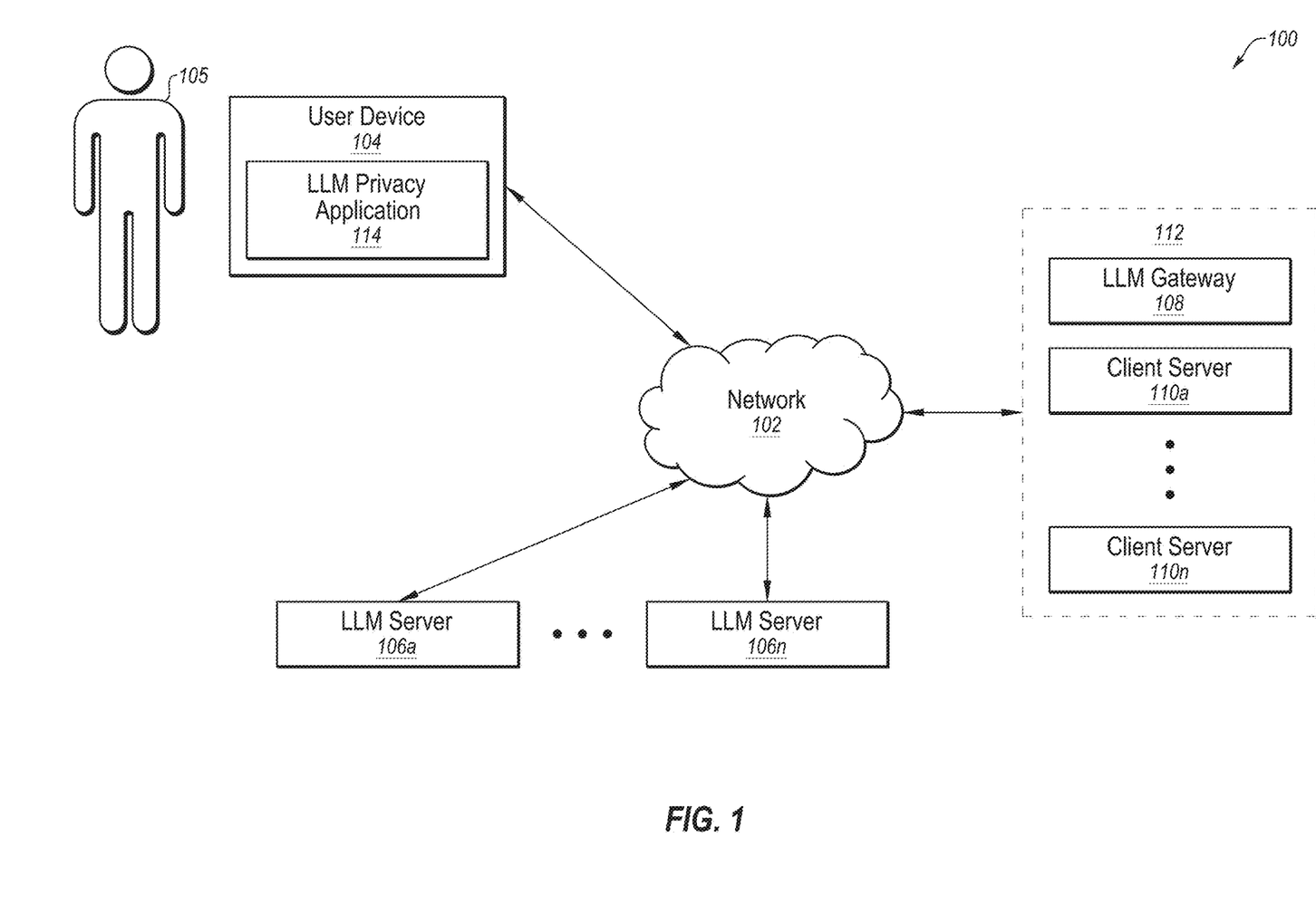
FIG. 1 illustrates an example system configured for protecting private information during LLM interactions.

Turning to the figures, FIG. 1 illustrates a system 100 configured for protecting private information during LLM interactions. The system 100 includes a network 102, a user device 104 and associated user 105, LLM servers 106a-106n, an LLM gateway 108, and client servers 110a-110n. The LLM gateway 108 and client servers 110a-110n may be part of a privacy subsystem 112.

In some embodiments, the network 102 may be configured to communicatively couple the user device 104, the LLM servers 106a-106n, the LLM gateway 108, and the client servers 110a-110n. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 5:
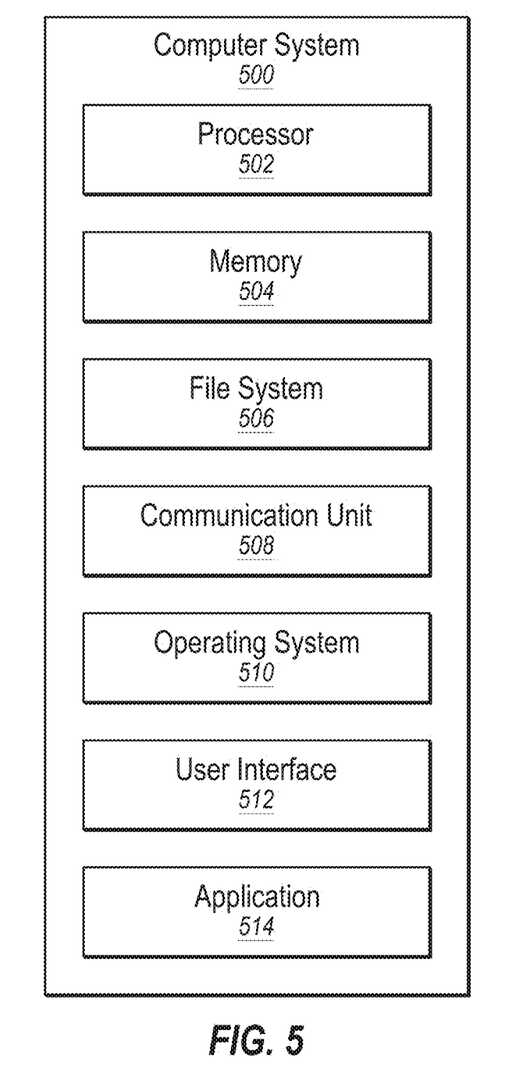
FIG. 5 illustrates an example computer system that may be employed in protecting private information during LLM interactions.

In some embodiments, the user device 104 may be any computer system capable of communicating over the network 102, examples of which are disclosed herein in connection with the computer system 500 of FIG. 5. The user device 104 may include an LLM privacy application 114 that, together with the privacy subsystem 112, protects the user 105 from disclosing private information through an interaction with one of the LLM servers 106a-106n.

In some embodiments, the LLM servers 106a-106n may be any computer system capable of communicating over the network 102, examples of which are disclosed herein in connection with the computer system 500 of FIG. 5. The LLM servers may be associated with LLM providers that makes their LLMs available through the servers 106a-106n.

In some embodiments, the LLM gateway 108 and client servers 110a-110n may be any computer systems capable of communicating over the network 102, examples of which are disclosed herein in connection with the computer system 500 of FIG. 5. As discussed in more detail below, the LLM gateway 108 and the client servers 110-110n are configured to protect private information during large LLM interactions.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
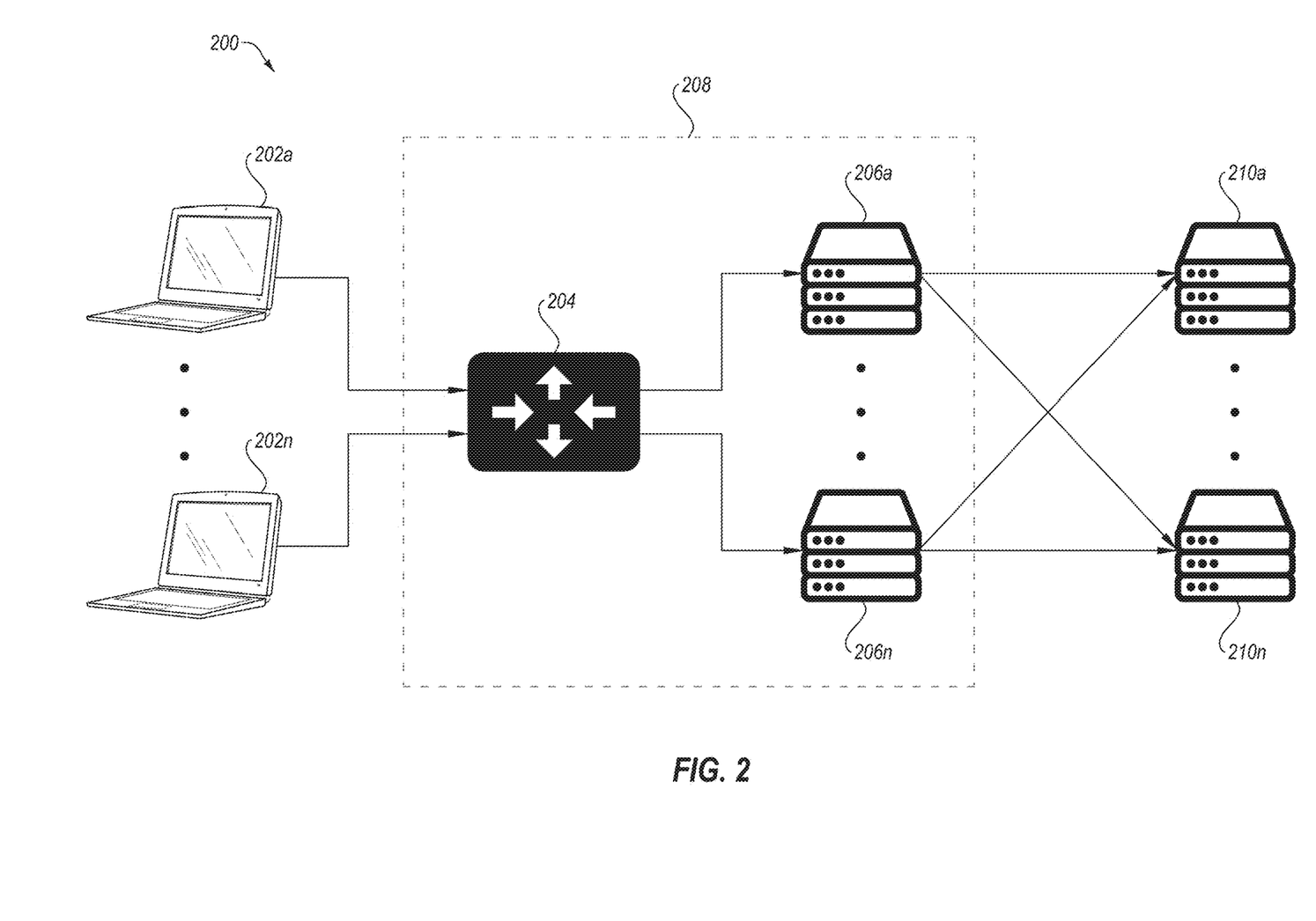
FIG. 2 illustrates an example process flow diagram for protecting private information during LLM interactions.

FIG. 2 illustrates an example process flow diagram 200 for protecting private information during LLM interactions. According to one embodiment of the present disclosure, an LLM interaction may begin with one or more users entering a prompt into a user device 202a-202n, such as a personal computer. The user devices 202a-202n may include a privacy application installed, through which the prompt is entered.

An LLM gateway 204 may intercept LLM prompts that are entered through a privacy application on the user devices 202a-202n before the prompt is sent to any LLM server. In some embodiments, the LLM gateway 204 may determine a level of sensitivity of the prompt. To the this, the LLM gateway 204 may evaluate the prompt for private information. This information could include personal information about the user or information that is otherwise confidential. In some embodiments, a user may provide the LLM gateway 204 with instructions regarding what to identify as private information. For example, a user may specify that any personal information including the user's name, birthdate, address, identification numbers, marital status, health/financial details, etc. are to be considered private information. The user may further specify that any documents bearing a confidentiality designation such as "private," "confidential," "sensitive," etc. should be considered private information.

In other embodiments, the LLM gateway 204 may determine independently whether a prompt includes private information based on a list of words and/or phrases that identify or indicate the presence of private information. In some embodiments, the LLM gateway 204 may employ a machine learning classifier to separate private prompts from prompts that do not include any private information.

In some embodiments, when the LLM gateway 204 identifies private information within a prompt, the LLM gateway 204 may further evaluate whether the private information is necessary for the user to receive the information that he or she is seeking. For example, suppose a user submits a medical document containing a report of the user's general health conditions and requests that an LLM summarize the medical document to a 1-page summary. Any information identifying the user (such as the user's name or date of birth), would be unnecessary for an LLM to provide the requested summary. In this example, the LLM gateway 204 may determine that this personal information is unnecessary and can be removed from the prompt. The LLM gateway 204 may generate a revised prompt in which the unnecessary personal information is redacted, removed, or replaced with information that does not correspond to the user.

On the other hand, in some cases, the private information submitted in a prompt may be necessary for the user to receive the information that he or she is seeking. For example, suppose a user submits a confidential report that the user wants summarized into a 1-page document. In this example it may not be possible to provide the requested summary if the confidential information has been redacted, removed, or replaced.

Thus, in some embodiments, the LLM gateway 204 may evaluate original prompts for private information, determine whether the private information may be removed and, if so, create a revised prompt without the private information. The LLM gateway 204 may then determine a level of sensitivity of the original prompt or of the revised prompt (if some private information is removed from the prompt). The level of sensitivity may be based on an amount of private information that is contained within a prompt and/or a degree of the private information contained (how private is the information). For example, some information, such as a user's name and age may not be as sensitive as other information such as the user's health status or financial condition. Thus, private information may have different degrees.

The LLM gateway 204 may also identify a plurality of LLM providers and may rank these LLM providers based on a level of user privacy that each provide. For example, an LLM provider that retains user prompts to further train its LLM, such as open source LLM providers, may have a low level of user privacy rank. An LLM provider that maintains user prompts private and does not use them to train its LLM, such as a privately hosted LLM, may have a higher level of user privacy rank. Additionally, guard rails and safety nets put in place by the LLM providers to prevent accidental leaks of personal data may also be evaluated to determine an appropriate level of user privacy for each LLM provider. Other session management details may also be evaluated (such as how LLM providers treat prompts, how they secure users' session data, how they treat logs associated with prompts, etc.) and impact an LLM's level of user privacy rank. The ranked LLM providers may be associated with LLM servers 210a-210n.

In some embodiments, the LLM gateway 204 may not perform the actual ranking of LLM providers. In these embodiments, the LLM gateway 204 may simply receive a listing of LLM providers with their rankings based on levels of privacy already identified.

Based on a level of sensitivity associated with prompts and the levels of user privacy offered by LLM providers, the LLM gateway 204 may identify an appropriate LLM server 210a-210n to which the prompt should be sent. For example, the LLM gateway may identify an open source LLM server (that has a very low level of user privacy) for a prompt that does not include any private information (and thus has a low level of sensitivity). On the other hand, the LLM gateway 204 may identify a privately hosted LLM server (that has a very high level of user privacy) for a prompt that includes a large amount of or a high degree of private information (and thus has a high level of sensitivity).

Once this determination is made, the LLM gateway 204 may send the prompt, along with an instruction identifying an LLM server to respond to the prompt, to one of client servers 206a-206n. The LLM gateway 204 together with the client servers 206a-206n may form a privacy subsystem 208. Any number of client servers 206a-206n may be part of the privacy subsystem 208. In some embodiments, there may be only a single client server associated with an LLM gateway. In embodiments where there is a plurality of client servers 206a-206n in the privacy subsystem 208, the client servers 206a-206n may be distributed in geographically diverse locations. For example, the client servers 206a-206n may be spread across different regions of the world. In some embodiments, the LLM gateway 204 may select the client server randomly. In some embodiments, the LLM gateway may ensure that the client server that receives the prompt is not in the same location as the user.

Each of the client servers 206a-206n may possess their own unique access credentials to the LLM servers 210a-210n. In some embodiments, the access credentials may include a username and a password. In some embodiments, elements of personal information may be required in order to obtain the access credentials. These access credentials, and any information provided to obtain the access credentials, may be completely unassociated with any specific user. Thus, when a prompt that is submitted by a user is routed to one of the LLM servers 210a-210n through one of the client servers 206a-206n, it will not be possible to determine any information about the user that sent the prompt through the access credentials of the account that actually submitted the prompt to the LLM server.

For example, suppose a user associated with the user device 202a submits an LLM prompt through an LLM privacy application. That prompt is intercepted by the LLM gateway 204, where the prompt is evaluated for sensitive information. Based on this evaluation (and the ranked listing of LLM providers), the LLM gateway 204 identifies the LLM server 210a as the proper LLM server to receive the prompt. The LLM gateway 204 would then forward the prompt to one of the client servers 206a-206n to actually submit the prompt to the LLM server 210a. If the LLM server 210a (or another) attempted to connect the prompt with the user based on the credentials of the account that submitted the prompt, the credentials would identify the client server that submitted the prompt, not the user. Thus, there could be no association of the prompt with the user that actually entered the prompt.

In addition, in embodiments where the client servers 206a-206n are geographically diverse, a location of the client server will also not provide any indication of where the user is located. For example, if a user in North America submits a prompt, it may be randomly routed through a client server in Europe. Once a response is received, it is routed back to the user device that submitted the prompt.

LLM providers often provide the ability to submit follow up prompts within the same conversation. This allows users to further refine their prompts and allows LLMs to use previous prompts and responses to provide more precise answers. In some embodiments, the LLM gateway 204 may similarly keep all prompts in a conversation together. When evaluating a level of sensitivity associated with a prompt, the LLM gateway 204 may evaluate all of the prompts within the conversation, not just the most recent prompt. The most recent prompt will be assigned a level of sensitivity that is associated with the most sensitive prompt, even if that is not the most recent prompt. Thus, the LLM server that receives the prompt will receive the benefit of prior responses, even if that LLM server did not provide the previous responses.

For example, a user may submit a first prompt that has a low level of sensitivity and therefore is routed to an LLM server having a low level of user privacy. If the user submits a follow up prompt in this conversation that introduces some private information, the LLM gateway may upgrade the level of sensitivity associated with the prompt. Based on this upgraded level of sensitivity, the new prompt may be assigned to a new and different LLM server. However, in order to provide a thorough response, the first prompt and response (from the first LLM server) will be included in the submission to the second LLM server. If the user submits a third follow up prompt that again lacks any private information, it will still be assigned the sensitivity level of the second prompt and will be routed to a client server that has a level of privacy that is appropriate for the second prompt. Thus, in a conversation, the prompt having the highest level of sensitivity will always be used for the latest prompt.

Figure 3:
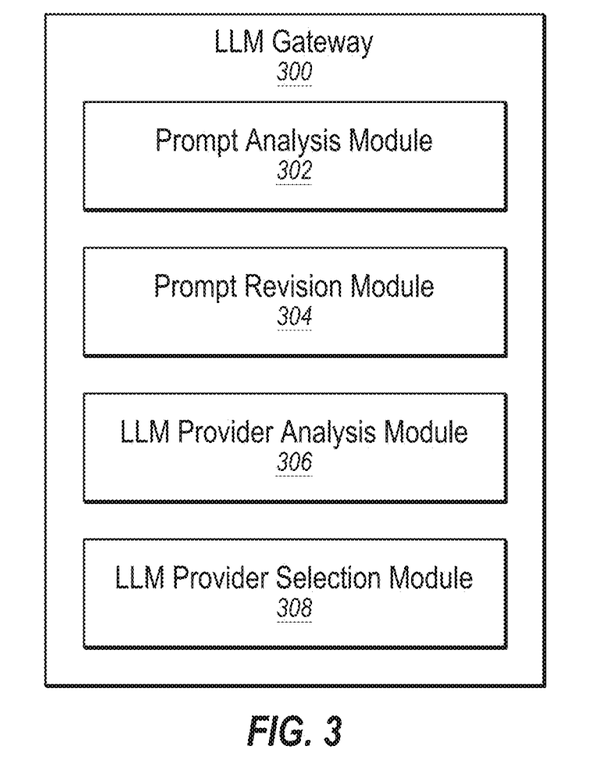
FIG. 3 illustrates an LLM gateway according to the present disclosure.

FIG. 3 illustrates an LLM gateway 300 according to the present disclosure. The LLM gateway 300 includes a prompt analysis module 302, a prompt revision module 304, an LLM provider analysis module 306, and an LLM provider selection module 308.

In some embodiments, the prompt analysis module 302 may be configured to analyze received prompts and determine a level of sensitivity associated with the prompts. The level of sensitivity associated with the prompt may be determined based on an amount and/or degree of private information contained within the prompt. The prompt analysis module 302 may also be configured to determine whether any private information contained within the prompt is necessary in order for a response to be provided.

In some embodiments, the prompt revision module 304 may remove, redact, or replace private information that the prompt analysis module 302 identifies as unnecessary. The prompt revision module may generate a revised prompt that lacks this unnecessary private information.

In some embodiments, the LLM provider analysis module 306 may evaluate a plurality of LLM providers and rank them based on levels of user privacy that each offers. For example, open source LLM providers that retain user prompts to further train their LLMs may have a low level of user privacy rank. On the other hand, privately hosted LLMs that maintain user prompts private and do not use them to train their LLMs, have a higher level of user privacy rank. Guard rails and other safety nets put in place by the LLM providers to prevent accidental leaks of personal data may also be evaluated to determine an appropriate level of user privacy for each LLM provider. Other session management details may also be evaluated (such as how LLM providers treat prompts, how they secure users' session data, how they treat logs associated with prompts, etc.) and impact an LLM's level of user privacy rank.

In some embodiments, an LLM gateway may not include an LLM provider analysis module. In these embodiments, a listing of LLM providers that have already been ranked based on levels of privacy offered may simply be received by an LLM gateway.

Regardless of whether the ranked list is created or received, the LLM provider selection module 308 may identify an appropriate LLM provider to respond to the prompt. The LLM provider selection module 308 may do this by correlating the level of sensitivity associated with a prompt with a level of user privacy that is offered by the LLM provider. As a level of sensitivity associated with a prompt increase, so will the level of user privacy offered by the LLM provider selected to respond to the prompt.

Modifications, additions, or omissions may be made to the LLM gateway 300 without departing from the scope of the present disclosure. For example, the LLM gateway 300 may include additional components similar to the components illustrated in FIG. 3 that each may be configured similarly to the components illustrated in FIG. 3. Further, in some embodiments, the functionality of the LLM gateway 300 may be spread across two or more separate LLM gateway devices.

Figure 4A:
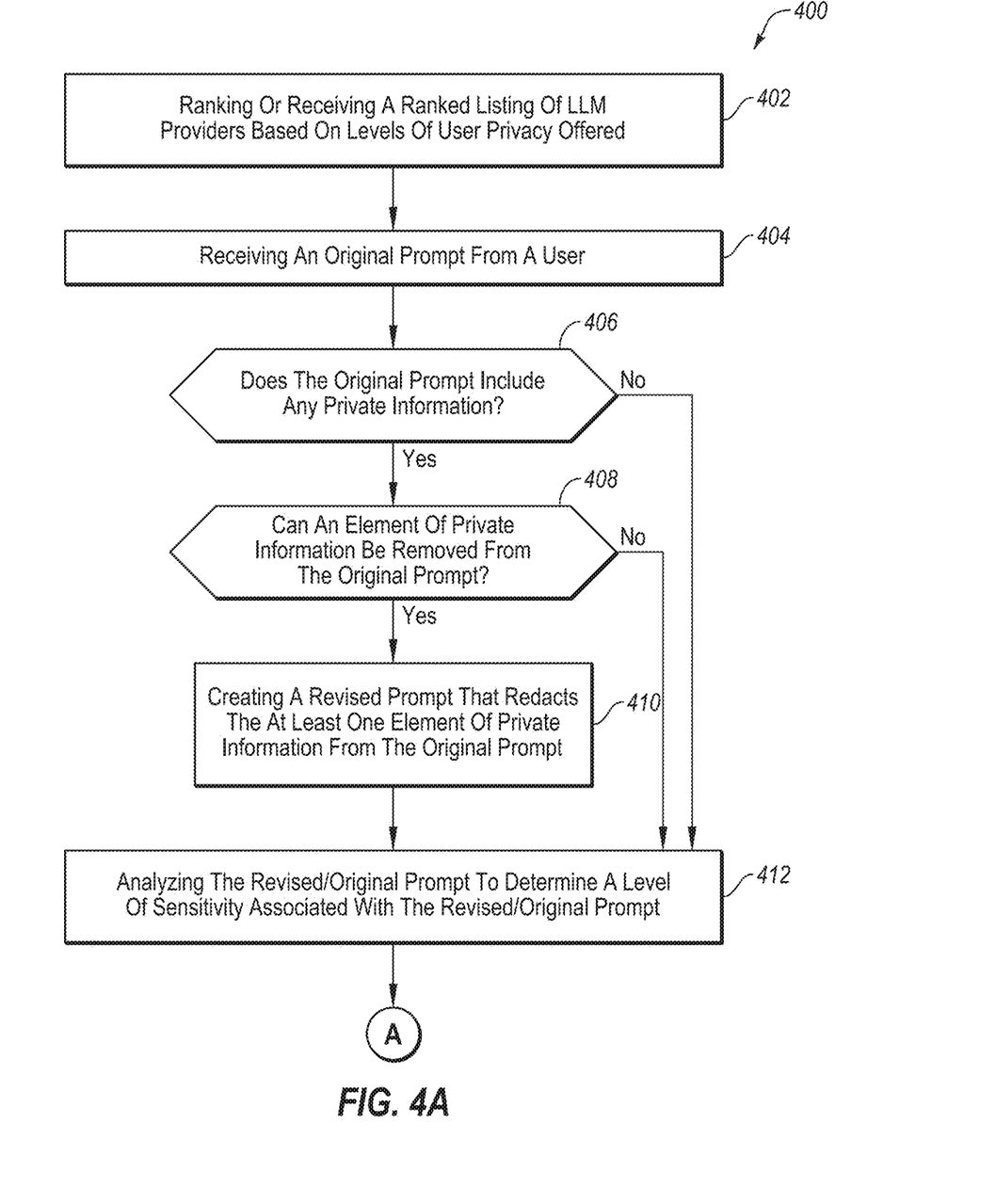
FIGS. 4A and 4B illustrate a flowchart of an example method for protecting private information during LLM interactions.
Figure 4B:
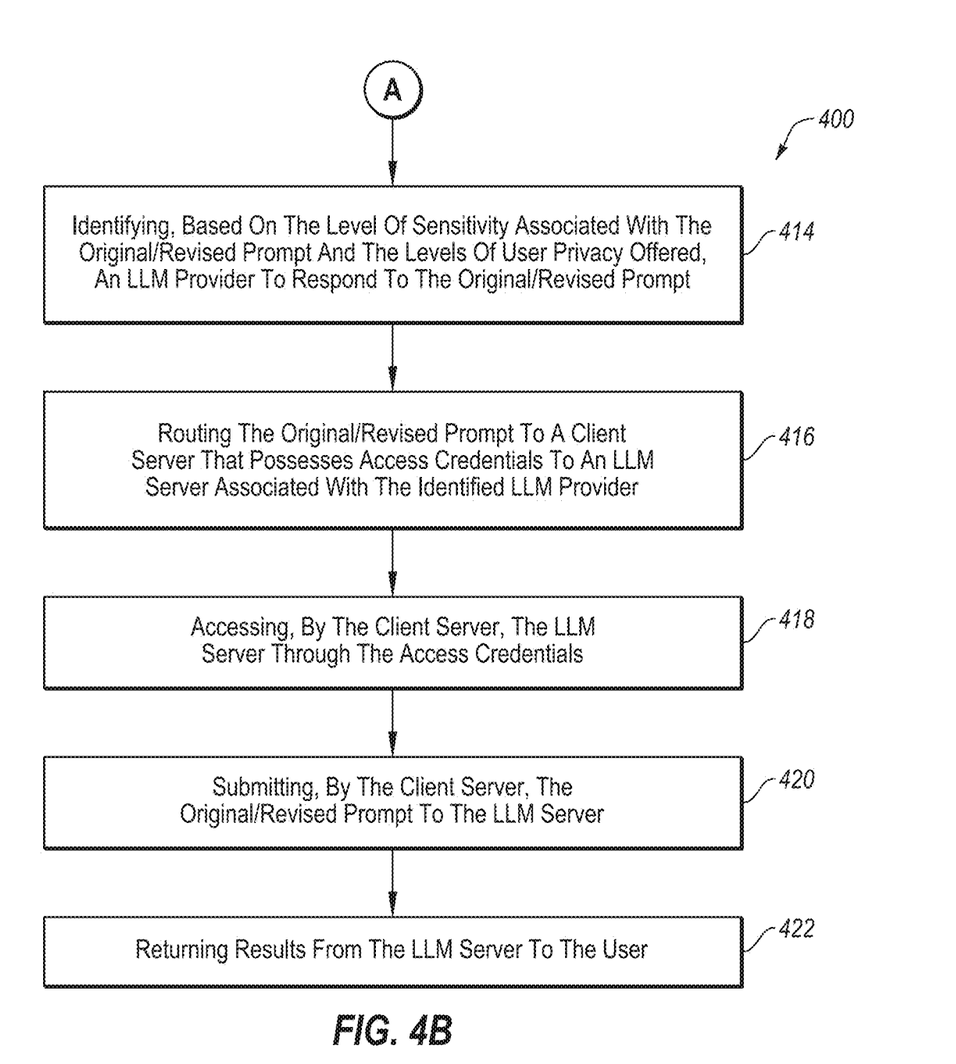

FIGS. 4A and 4B illustrate a flowchart of an example method 400 for protecting private information during LLM interactions. In these and other embodiments, the method 400 may be performed by one or more processors based on one or more computer-readable instructions stored on one or more non-transitory computer-readable media.

The method 400 may include, at action 402, ranking or receiving a ranked listing of LLM providers based on levels of user privacy offered. As provided herein, the level of user privacy offered may include an evaluation of guard rails and safety nets put in place by the LLM providers to prevent accidental leaks of personal data. Other session management details, such as how LLM providers treat prompts, how they secure users' session data, and how they treat logs associated with prompts may also be evaluated.

The method 400 may include, at action 404, receiving an original prompt from a user. In some embodiments, the original prompt may be received by an LLM gateway device from a user device. The method 400 may include, at action 406, an evaluation of the original prompt to determine whether it includes any private information. If it is determined that the original prompt lacks private information, the method 400 may proceed to action 412. However, if it is determined that the original prompt includes private information, the method 400 may include at action 408, a determination of whether an element of the private information can be removed from the original prompt. In some embodiments, an element of private information may be removable from a prompt if the quality of an LLM response would not be affected by submitting the prompt to an LLM without the private information. If it is determined that no element of private information can be removed from the original prompt, the method 400 may proceed to action 412. However, if it is determined that an element of private information can be removed from the original prompt, the method 400 may include at action 410, creating a revised prompt that redacts the at least one element of private information from the original prompt.

The method 400 may include, at action 412, analyzing the revised/original prompt (depending on whether a revised prompt was generated) to determine a level of sensitivity associated with the revised/original prompt. The determined level of sensitivity may be based on either an amount of private information contained within the prompt, a degree of private information contained within the prompt, or both.

The method 400 may include, at action 414, identifying, based on the level of sensitivity associated with the original/revised prompt and the levels of user privacy offered, an LLM provider to respond to the original/revised prompt. For prompts having a higher level of sensitivity, an LLM provider with a higher level of user privacy offered may be identified. On the other hand, for prompts having a lower level of sensitivity, an LLM provider with a lower level of user privacy offered may be identified.

The method 400 may include, at action 416, routing the original/revised prompt to a client server that possesses access credentials to an LLM server associated with the identified LLM provider. In some embodiments, there may be a number of different client servers to which the prompt may be routed. These client servers may be located in geographically diverse places. In these embodiments, the specific client server to whom the prompt is routed may be selected randomly. In addition, the access credentials possessed by each client server may be unique to the client server and unassociated with the user. In some embodiments, the client server through which the prompt is routed may not be in the same location as the user.

The method 400 may include, at action 418, accessing, by the client server, the LLM server through the access credentials. These access credentials may include a username and a password. The method 400 may include, at action 420, submitting, by the client server, the original/revised prompt to the LLM server and at action 422 returning results from the LLM server to the user.

Although the actions of the method 400 are illustrated in FIGS. 4A-4B as discrete actions, various actions may be divided into additional actions, combined into fewer actions, reordered, expanded, or eliminated, depending on the desired implementation. For example, in some embodiments, a method may simply protect a user from submitting personal information in order to gain access to an LLM server. In these embodiments, a method may only lack actions 406-414.

Further, it is understood that the method 400 may improve the functioning of a computer system itself. For example, the functioning of a privacy subsystem as described herein may eliminate the need for a user device to have application installed for a number of different LLM providers. According to embodiments of the present disclosure, a single LLM application may be installed and, based on the content of a prompt, any number of different LLM providers may be used to provide a response. Also, the method 400 may improve the technical field of user privacy with LLM interactions.

FIG. 5 illustrates an example computer system that may be employed in protecting private information during LLM interactions. In some embodiments, the computer system 500 may be part of any of the systems or devices described in this disclosure. For example, the computer system 500 may be part of any of the user device 104, the LLM servers 106a-106n, the LLM gateway 108, and the client servers 110a-110n of FIG. 1, the user devices 202a-202n, the LLM gateway 204, the client servers 206a-206n, and the LLM servers 210a-210n of FIG. 2, and the LLM gateway 300 of FIG. 3.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, a networking device, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more of the actions of the methods disclosed herein.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more of the actions of the methods disclosed herein. These computer-executable instructions may be included, for example, in the operating system 510, in one or more applications, such as the LLM privacy application 114 of FIG. 1.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more of the actions of the methods disclosed herein. In some embodiments, the application 514 may be part of the operating system 510 or may be part of an application of the computer system 500, or may be some combination thereof. In some embodiments, the application 514 may function as the LLM privacy application 114 of FIG. 1.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting private information during large language module model (LLM) interactions, at least a portion of the method being performed by a computing device comprising one or more processors, the method comprising:
   receiving a ranked listing of LLM providers based on levels of user privacy offered;
   receiving a prompt from a user;
   analyzing the prompt to determine a level of sensitivity associated with the prompt, wherein the level of sensitivity is determined based on an amount and/or degree of private information contained within the prompt;
   selecting an LLM server to generate a response to the prompt based on the level of sensitivity associated with the prompt and a level of user privacy offered by the LLM provider associated with the LLM server;
   routing the prompt through a client server that possesses access credentials to the LLM server, wherein the access credentials of the client server are unassociated with the user and prevent the LLM provider from associating the prompt submission with the user's identity via account credentials;
   accessing, by the client server, the LLM server through the access credentials;
   submitting, by the client server, the prompt to the LLM server; and
   returning results from the LLM server to the user.

2. The method of claim 1, wherein the access credentials include a username and password.

3. The method of claim 1, wherein obtaining access credentials requires disclosure of personal information.

4. The method of claim 3, wherein the personal information includes a name and a birth date.

5. The method of claim 1, wherein geographical locations of the user and the client server are different.

6. The method of claim 1, further comprising:

receiving a second prompt from the user;

routing the second prompt through a second client server that possesses second access credentials to the LLM server, wherein geographical locations of the client server and the second client server are different;

accessing, by the second client server, the LLM server through the second access credentials;

submitting, by the second client server, the second prompt to the LLM server; and returning results from the LLM server to the user.

7. The method of claim 1, wherein the private information includes personal information about the user or information that is not publicly known.

8. The method of claim 1, wherein the prompt is determined to have a low level of sensitivity and the LLM server is an open source LLM provider.

9. The method of claim 1, wherein the prompt is determined to have a high level of sensitivity and the LLM server is a private LLM provider.

\* \* \* \* \*